July 11, 1939.  S. PELLE  2,165,674
KEYLESS LOCKING MECHANISM
Original Filed Aug. 24, 1934  2 Sheets-Sheet 1
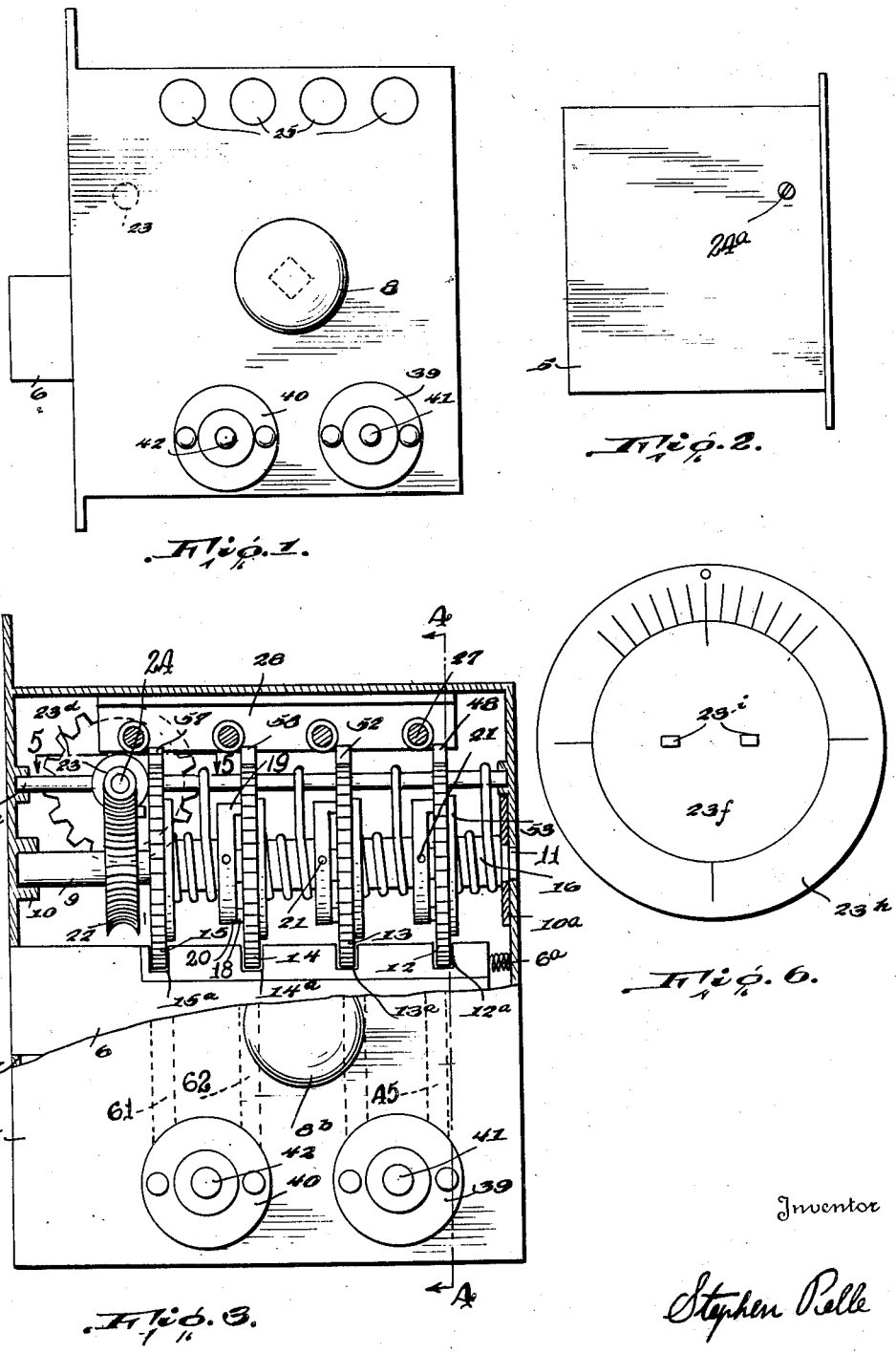
Inventor
Stephen Pelle July 11, 1939. S. PELLE 2,165,674
KEYLESS LOCKING MECHANISM
Original Filed Aug. 24, 1934 2 Sheets-Sheet 2

Inventor
Stephen Pelle

Patented July 11, 1939

2,165,674

UNITED STATES PATENT OFFICE 2,165,674

KEYLESS LOCKING MECHANISM

Stephen Pelle, New York, N. Y.

Application August 24, 1934, Serial No. 741,339
Renewed May 29, 1939

7 Claims. (Cl. 70—144)

This invention relates to improvements in keyless locks, and one of its objects is to provide a lock which may be operated to release the locking bolt, by means of a series of toothed wheels, and step-by-step mechanism, which can be selectively controlled, to move the wheels into releasing position.

Another object of the invention is the provision of a keyless or combination lock with a step-by-step mechanism which is operated by push buttons, to affect a predetermined movement of each of the toothed locking wheels, and another step-by-step mechanism which is operated by independent means for advancing the movement of each toothed locking wheel a greater degree.

A further object of the invention is to provide a combination locking mechanism, having a series of toothed wheels provided with bolt releasing notches, means for advancing the wheels a predetermined distance, to provide for selection of the step-by-step mechanism to secure a moderate movement of the toothed wheels, and additional means for advancing the wheels in pairs at a relatively greater rate of movement.

A still further object of the invention is the provision of a locking mechanism of this type, with additional means for turning all of the toothed wheels at one time.

With the above and other objects in view the invention consists in certain new and useful constructions and combinations of parts, clearly described in the following specification, and fully illustrated in the accompanying drawings, in which:

Fig. 1 is a front elevation, showing the locking bolt extended.

Fig. 2 is a rear view showing the locking bolt retracted.

Fig. 3 is a front view, partly in vertical section, taken on line 3—3 of Fig. 4, looking in the direction of the arrows.

Fig. 6 is a detail vertical sectional view through the right end of the operating shaft and its toothed wheel.

Figures 4, 9, 10:
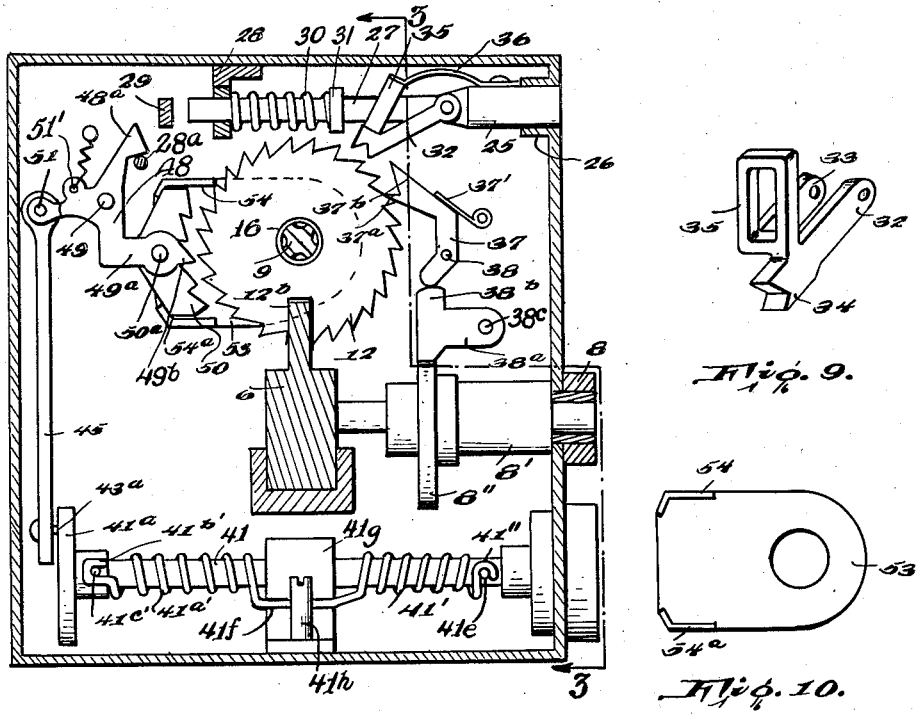
Fig. 4 is a vertical sectional view taken on line 4—4 of Fig. 3, looking in the direction of the arrows.
Fig. 9 is a detail perspective view of a pawl.
Fig. 10 is side view of a pawl carrier plate.
Figures 5, 5A:
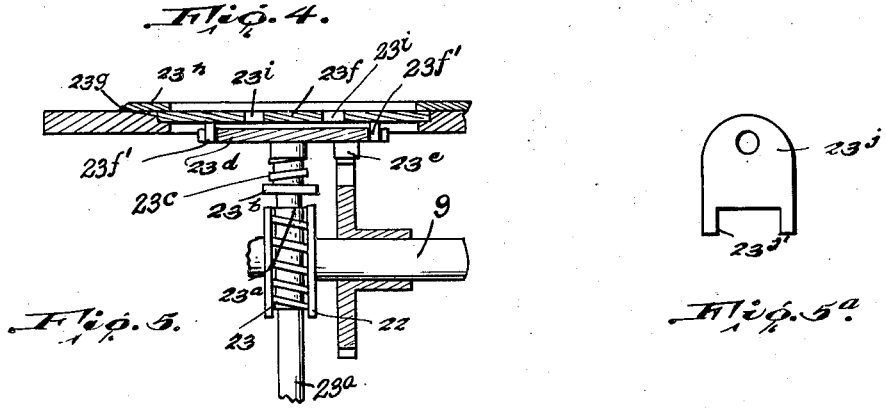
Fig. 5 is a horizontal sectional view, taken on line 5—5 of Fig. 3, looking in the direction of the arrows.
Fig. 5A is a detail side elevation of a part.
Figures 7, 8:
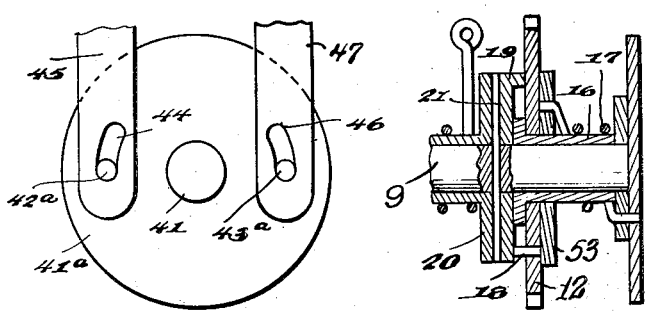
Fig. 7 is a detail end view of a two-way operating wheel.
Fig. 8 is a detail view in section of one of the manually shifted operating pawls.

Referring to the accompanying drawings illustrating the practical construction of my invention 5 designates the case of the improved locking mechanism, in which the locking bolt 6 works through the opening 7 formed in one end of the case. The bolt is shifted when released from locking position by any convenient means. As here illustrated there is provided a knob 8.

The locking bolt is held against manual movement by a series of toothed wheels, which are mounted to simultaneously engage notches formed in one edge of the locking bolt. These notches are spaced longitudinally from each other and the toothed wheels are mounted to turn on the cross shaft 9, which is supported at one end on the bearing 10, and at the other end on the bearing 10a.

The toothed wheel 12 is mounted to fill the notch 12a of the bolt; the toothed wheel 13 is mounted to fill the notch 13a of the bolt; the toother wheel 14 is mounted to fill the notch 14a of the bolt; and the toothed wheel 15 is mounted to fill the notch 15a of the bolt. These toothed wheels are constructed similarly, and are similarly mounted on the shaft.

Each toothed wheel turns on a sleeve 16, and is engaged on one side by the coil spring 17, one end of which is fixed relative to the shaft, and the other end of which is connected to the toothed wheel. Each toothed wheel is provided with a lateral stop pin 18, which is adapted to engage the lateral stop 19 formed on the collar 20. This collar is keyed to the shaft 9 by means of the pin 21, which may pass through the shaft at any desired angle.

One end of the shaft is equipped with a worm gear 22, which is engaged by the worm 23, so that the entire shaft may be turned by a single operation at one end of the same, by a special tool placed against the inner side of the lock case. The shaft 23a of the worm 23 is provided with a shoulder 23b which is engaged by the coil spring 23c at one end, the other end of the coil spring engaging the toothed wheel 23d, which is slidable on the shaft. This toothed wheel is formed with a lateral locking lug 23e, which engages the bolt notch of the adjacent toothed ratchet wheel of the shaft. The toothed wheel or disc 23d is turned by means of the disc 23f, which is mounted to turn in the opening 23g, being retained in place by means of the ring 23h, which is graduated. The movable disc 23f is formed or provided with lateral lugs 23f', on opposite sides thereof, which engage the teeth of the wheel 23d. The outer end of the worm shaft 23a is fixed to the disc 23f, and on each side of the center of this disc key openings 23i are formed, which are designed to receive the fingers or points of the hand key 23j, which may be inserted in said key holes or openings, operated to turn the disc 23f and then withdrawn.

When the key 23j is inserted in the openings 23i the toothed wheel 23d will be forced inwardly, by the action of the projections 23j' of the key 23j, and this will move the locking lug 23e into the notch of the nearest toothed ratchet wheel on the shaft, and at the same time disengage the toothed wheel 23d from the disc 23f, so that the disc 23f may be turned. When the disc is turned the shaft 23a will be turned, thus transfering motion to the main shaft 9, and permitting the simultaneous resetting of all of the ratchet wheels thereon, by changing the relative positions of the stops fixed to the shaft 9.

The toothed wheel 12 is formed with a notch 12b, which is designed to register with the bolt; the toothed wheel 13 is formed with a notch 13b, also designed to register with the bolt; the toothed wheel 14 is formed with a notch 14b, also designed to register with the bolt; and the toothed wheel 15 is likewise formed with a notch 15b, for similar purposes. When all of the notches of the toothed wheels are longitudinally aligned with the bolt, the spring which propels the bolt may be compressed by the rotative movement of the knob, which retracts the bolt from its normal outward locking position. The pulled spring is here illustrated for convenience for the drawings in the form of a compression spring 6a (see Figure 3), although it will be understood that any suitable spring may be used.

Each toothed wheel is advanced step-by-step by means of the manually shifted pawl mechanism shown to the right in Fig. 4. Each pawl mechanism includes the push button 25, which slides through the bearing 26 in the case 5. This button is mounted on the end of the rod 27, which works through the bearing 28, against the limit stop 29. A coil spring 30 engages the shoulder 31 of the rod 27, sliding on said rod, to return the button to its original position. To the button the arms 32 and 33 of the pawl 34 are pivoted. This pawl includes the yoke 35 which has a limited sliding movement on the rod 27, and which is engaged by the leaf spring 36, secured to the inner end of the button, which acts to return the pawl from engagement with the adjacent toothed or ratchet wheel, after the button has been pressed.

The teeth of each wheel are of the ratchet type, and all of the teeth of all of the wheels on the shaft 9 project in a common direction. Each toothed or ratchet wheel is engaged by a spring pressed pawl.

The pawl lever 48 is pivotally supported on a shaft 28a. Plate 53, which swings around the shaft 9, is provided with an L-shaped guide 54 on its upper end, which engages the toothed segment 50, and a similar L-shaped guide 54a on its lower end, which engages the lower end of the toothed segment, to limit the outward pivotal action of the same, and to maintain the segment in approximate parallel relation to the edge of the toothed gear 12, the teeth of which are engaged by the teeth of the gear segment 50. The toothed segment 50 has four teeth of its own, and the end of the arm 49a is formed with a tooth 49b, which cooperates with the teeth of the segment 50 to provide a series of five ratchet teeth to engage the ratchet teeth of the wheel 12. The carrying plate 53 is maintained in its normal position by any suitable means The pawl lever 48 is formed with an arm 48a which overlies and engages the shaft 28a, and is engaged by the spring connected at 51' to the lever 48 near the pivotal connection 51 with the upright rod 45. When the rod 45 is moved downwardly the lever 48 will swing on the shaft 28a, thus moving or swinging the toothed segment 50 into engagement with the toothed wheel 12. The toothed segment is maintained in proper working relation to the toothed wheel 12 by means of the plate 53, which permits this movement of the toothed segment toward the wheel 12.

The shaft 41 is equipped with a coil spring 41a', which is formed with a terminal finger 41b', engaged by the lateral pin 41c', secured to the operating disc 41a. Another coil spring 41' is arranged on the other end of the shaft, and is formed with a terminal finger 41'' which is adapted to engage the lateral pin 41e fixed to the forward end of the shaft 41. The terminal finger 41b' faces in one direction and the terminal finger 41'' faces in the opposite direction. The two spring coils may be connected to each other by means of the strap 41f, which engages the intermediate bearing 41g, and which may be held in its normal position by means of the screw or retaining element 41h. When the shaft 41 is turned in one direction of rotative movement the rod 45 will be pushed downwardly, while the rod 47 will not be acted upon, due to the arcuate slot in its lower end. When the shaft 41 is rocked in the opposite direction the rod 47 will be pushed downwardly and the rod 45 will not be acted on.

The toothed wheels 15 and 14 are engaged by a similar pair of toothed segments not shown, which are pivotally supported on pawl levers. The construction in this respect being similar to the pawl lever 48 and being similarly connected. It will be understood that the pawl levers for the wheels 15 and 14 are connected to the push rods 61 and 62 in the same manner that the pawl lever 48 is connected to the push rod 45 and that they are in turn operated by a disc on the shaft 42, which is constructed and arranged in the same manner as the shaft 41.

The segments and the button operated pawls are normally disengaged from the teeth of the wheels, but the spring pressed pawls which work below the button operated pawls are normally engaged with the toothed wheels, to prevent reverse rotation of the same. As the toothed wheels are advanced the coil springs which engage them are placed under increased tension. The wheels make nearly one complete revolution, being restrained by the lateral stops, which engage the stop pins, and when the wheels have been turned so that all of their notches are placed in registration with locking bolt, the latter is operated by its knob, and when this is done all of the holding pawls below the buttons are released by any suitable means.

The arrangements and proportions of the parts are such that the operation of the segments advances the wheels three teeth, while the operation of the button actuated pawls advances the wheels two teeth.

The end of the shaft carries, as described, a gear wheel 22, which is engaged by the worm gear 23, by means of which all of the toothed wheels may be turned from the rear side of the lock case by means of a suitable screw driver or other tool.

The shaft 8' of the hand knob 8 is provided with a cam 8", which engages a lever 38a, pivoted at 38c, which engages the cross rod 38b arranged to engage all of the pawls similar to the pawl 37, so that all of these pawls may be released at one time, and the toothed wheels permitted to return to original position by reason of the release of the coil springs 17 therefore. In this way by a single turning movement of the knob the entire locking mechanism can be reset.

An almost indefinite number of combinations may be arranged with the locking mechanism. No numbered dials are employed and the operation is effected by manual movements, which must be carefully noted, and made in the necessary sequence or order, to produce the required release of the locking bolt.

The push buttons are adapted to advance the toothed wheels two teeth at a time; while the pawls 50 are adapted to advance the toothed wheels three teeth at a time. This permits of the shifting of the toothed wheels in combinational order, so that neither one operating medium or the other can produce the necessary mechanical solution to a given combination. If the combination requires that the toothed wheels be advanced say 17 teeth, it will be impossible to produce this combination by operating either the push buttons or the rear pawls 50. It will be necessary, therefore, to operate both mechanisms. This can be done by operating the pawls 50 three times, thus producing an advance of nine teeth, and operating the buttons four times, thus producing an advance of eight teeth. The sum of these two movements will produce a total advance of 17 teeth.

Having described my invention I claim as new:

1. A keyless lock consisting of a bolt having a series or notches therein, a shaft, a series of ratchet toothed wheels on the shaft, each of said wheels being mounted to turn in one of the bolt notches and also having a notch to permit the sliding movement of the bolt across the wheel, a spring pressed button for each wheel, a pawl carried by each button to actuate each wheel, and means operated independently of the buttons for actuating the wheels to produce a differential setting action of the wheels.

2. A keyless lock consisting of a spring pressed locking bolt having a series of transverse notches therein, a shaft mounted in parallel relation to the bolt, a series of sleeves mounted on the shaft, a ratchet toothed wheel on each sleeve, each sleeve having a stop at one end, a coil spring on each sleeve having engagement with the ratchet toothed wheel thereof to turn the same in one direction, a pawl engaging each wheel to prevent the springs from turning the wheel in one direction, and a spring pressed button carrying a spring pressed and yielding pawl to engage each wheel, whereby each wheel may be turned in the opposite direction.

3. A keyless lock consisting of a locking bolt having a series of transverse notches therein, a shaft arranged in approximate parallel relation to the bolt, a series of ratchet toothed wheels mounted to turn on the shaft, a member adjacent each wheel having a stop, each wheel having a stop to engage said first stop, a spring for turning each wheel in one direction, a pawl lever pivoted adjacent each wheel, a toothed segment pivoted to each pawl to engage the teeth of its wheel, a pawl operating rod connected to each pawl lever, and a turnable member having operating connection with a plurality of said rods, whereby the turning of said member in one direction will actuate one of the pawl levers and the turning of the member in the opposite direction will actuate the other pawl lever, and only one of said pawl levers will be actuated at one time.

4. A keyless lock, consisting of a locking bolt having transverse notches therein, a shaft disposed in approximately parallel relation to the bolt, a series of wheels on the shaft, each wheel having ratchet teeth and formed with a notch to permit the bolt to shift across the wheel, each wheel normally fitting in a notch of the bolt, a spring on the shaft for turning each wheel in one direction only, means for limiting the turning movement of each wheel relative to the shaft, a shaft slidably mounted adjacent each wheel and provided with a button, a spring for shifting each shaft and button in one direction, and a pawl pivoted to each button and provided with a tooth to engage the adjacent wheel and further provided with a yoke through which the last named shaft extends which limits the movement of the pawl relative to the wheel.

5. A keyless lock, consisting of a spring pressed locking bolt having transverse notches therein, a shaft disposed in approximately parallel relation to the bolt, a series of ratchet toothed wheels on the shaft, each wheel being mounted to turn in one of the bolt notches and having a notch through which the bolt may slide when registered therewith, a spring on the shaft for turning each wheel in one direction only, a pawl engaging each wheel to prevent its turning under the action of the spring, means for advancing each wheel step-by-step to place the spring under additional tension, and a rod engaging all of said holding pawls to simultaneously release the same.

6. A keyless lock having a bolt formed with notches, a series of ratchet toothed wheels, each wheel having a notch registerable with the bolt and being mounted to turn in one of the bolt notches, spring pressed buttons having means for advancing the wheels step-by-step, a spring for turning each wheel in one direction, a pawl engaging each wheel to prevent its being turned in one direction by the action of its spring, a member engaging all said last named pawls to simultaneously release the same, a knob having operating connections with the bolt, and a cam carried by said knob for operating said member, whereby all of said wheels will be reset at one time by the reaction of said springs.

7. A lock consisting of a locking bolt having a series of notches therein, a shaft mounted to turn adjacent the bolt, a series of ratchet toothed wheels on the shaft, each wheel having a notch registerable with the bolt, a pawl lever pivoted adjacent each wheel, a toothed member pivoted to each pawl lever to engage and actuate its wheel, a rod connected with each pawl lever, the lower end of each rod having an arcuate slot therein, and a turnable member having a disc provided with pins engaging the slots, whereby the rods may be alternately actuated and the wheels can be alternately advanced step-by-step.

STEPHEN PELLE.